United States Patent
Benkreira et al.

(10) Patent No.: US 11,741,202 B2
(45) Date of Patent: Aug. 29, 2023

(54) SYSTEMS AND METHODS FOR EMPLOYING A CARD ROTATION SEQUENCE TO AUTHENTICATE A USER

(71) Applicant: Capital One Services, LLC, McLean, VA (US)

(72) Inventors: Abdelkader Benkreira, New York, NY (US); Michael Mossoba, Arlington, VA (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/900,679

(22) Filed: Aug. 31, 2022

(65) Prior Publication Data

US 2023/0137988 A1     May 4, 2023

Related U.S. Application Data

(63) Continuation of application No. 16/810,318, filed on Mar. 5, 2020, now Pat. No. 11,461,443.

(51) Int. Cl.
*G06F 21/31* (2013.01)
*G06F 21/34* (2013.01)
*G01P 13/04* (2006.01)
*G06Q 20/34* (2012.01)
*G06Q 20/40* (2012.01)
*G06Q 20/18* (2012.01)

(52) U.S. Cl.
CPC .......... *G06F 21/316* (2013.01); *G01P 13/04* (2013.01); *G06F 21/34* (2013.01); *G06Q 20/18* (2013.01); *G06Q 20/34* (2013.01); *G06Q 20/4014* (2013.01)

(58) Field of Classification Search
CPC ........ G06F 21/316; G06F 21/34; G01P 13/04; G06Q 20/18; G06Q 20/34; G06Q 20/4014
See application file for complete search history.

(56) References Cited

U.S. PATENT DOCUMENTS

| | | | |
|---|---|---|---|
| 2008/0196460 A1* | 8/2008 | Houlihan | E05B 37/08 70/285 |
| 2009/0205384 A1* | 8/2009 | Pomerantz | G07C 9/00309 70/278.3 |
| 2010/0121737 A1* | 5/2010 | Yoshida | G06F 3/04886 705/26.1 |

* cited by examiner

*Primary Examiner* — A. Hunter Wilder
*Assistant Examiner* — Joseph M Mutschler
(74) *Attorney, Agent, or Firm* — Hunton Andrews Kurth LLP

(57) ABSTRACT

Systems and methods for authenticating identification information are disclosed. For example, an Automated Teller Machine (ATM) may comprise a user interface. The user interface may comprise a card reader. The card reader may be configured for card rotation about an axis of a bank card. The user interface may be configured to receive card rotation input from a user. The ATM may comprise at least one memory storing instructions. The ATM may comprise at least one processor configured to execute the instructions to perform operations. The operations may comprise receiving identification information from the user. The operations may comprise receiving the card rotation input. The operations may comprise extracting a card rotation sequence from the card rotation input. When the card rotation sequence is within a predetermined threshold from a stored card rotation sequence corresponding to the identification information, the operations may comprise authenticating the user for an ATM operation.

20 Claims, 13 Drawing Sheets

SYSTEMS AND METHODS FOR EMPLOYING A CARD ROTATION SEQUENCE TO AUTHENTICATE A USER

BACKGROUND

Many payment terminals enable a merchant to capture required bank card (e.g., credit card, debit card, loyalty card) information and to transmit this data to a merchant services provider or bank for authorization and finally, to receive funds from a customer. Many payment terminals enable the merchant or the customer to swipe, insert, or hold the bank card near the device to capture the bank card information. Many payment terminals may be part of or connected to Point of Sale (POS) systems. Many POS systems enable payment amounts and confirmation of payment to be transferred automatically to a retail management system. Many payment terminals may be used in stand-alone mode, where the merchant keys an amount into the device before the customer presents a bank card.

Many Automated Teller Machines (ATMs) and payment terminals enable a customer to transmit required banking information wirelessly from a wireless device such as, for example, a smartphone, smartwatch, and/or electronic wallet. Many ATMs and payment terminals may receive required banking information from a customer via a wireless connection such as, for example, Bluetooth, Bluetooth Low Energy (BLE), NFC, Wi-Fi, cellular, RFID, or any other wireless connection.

Conventional ATMs and payment terminals often require a user (i.e., a customer) to enter a Personal Identification Number (PIN) to authenticate identification information via a keypad. Many payment terminals require a user to enter a zip code to authenticate identification information via a keypad. Identification information may be provided by a bank card, or provided separately via a wireless device. Providing identification information may require a login and/or password.

Problems may arise in conventional approaches and devices when users forget their PIN. This may result in inefficient transaction procedures. Also, use of a keypad in conventional devices may lead to breaches in security if onlookers are able to monitor and copy hand movements. When users associate a PIN with other personal information that can be easily compromised, breaches in security may result. In addition, a zip code associated with an account of a user can be easily compromised.

Accordingly, given the shortcomings of conventional approaches and devices, a need exists for unconventional approaches and devices that securely and efficiently enable users to authenticate their identification information.

SUMMARY

The disclosed embodiments provide unconventional systems and methods for authenticating identification information of a user. Embodiments consistent with the present disclosure are rooted in computer technology and may include processing a card rotation sequence from a user. Use of a card rotation sequence may lead to improved efficiency of completing transactions over conventional devices and approaches since a card rotation sequence may be easier to implement or remember than a Personal Identification Number (PIN) for many users. For example, a user may choose a card rotation sequence that mimics a memorized combination for unlocking a combination lock. Use of a card rotation sequence may improve security over conventional devices and approaches since a card rotation sequence may be more difficult than a PIN or zip code for onlookers to copy. Furthermore, personal information that may be compromised is less likely to be tied to a card rotation sequence than a PIN.

Consistent with the present embodiments, an Automated Teller Machine (ATM) is disclosed. An ATM may comprise a user interface, which may comprise a card reader, and may be configured to receive card rotation input from a user. The card reader may be configured for card rotation about an axis of a bank card. Card rotation input may comprise all movements, the timing of all movements, and/or the timing between all movements from a user operating the card reader. The ATM may comprise at least one memory storing instructions and at least one processor configured to execute the instructions to perform operations comprising: receiving identification information from the user, receiving the card rotation input, and extracting a card rotation sequence from the card rotation input. When the card rotation sequence is within a predetermined threshold from a stored card rotation sequence corresponding to the identification information, the operations may comprise authenticating the user for at least one ATM operation. The operations may further comprise: communicating the identification information to an authenticator, communicating the card rotation sequence to the authenticator, and receiving an authentication result from the authenticator. The authentication result may comprise a confirmation that the card rotation sequence is within the predetermined threshold from the stored card rotation sequence corresponding to the identification information. The operations may further comprise: encrypting the identification information prior to communicating to the authenticator, and encrypting the card rotation sequence prior to communicating to the authenticator.

Consistent with the present embodiments, a Point of Sale (POS) system is disclosed. A POS system may comprise a payment terminal, which may comprise a user interface. The user interface may comprise a card reader, and may be configured for card rotation about an axis of a bank card and configured to receive card rotation input from a user. The POS system may comprise at least one memory storing instructions and at least one processor configured to execute the instructions to perform operations comprising: receiving identification information from the user, receiving the card rotation input, and extracting a card rotation sequence from the card rotation input. When the card rotation sequence is within a predetermined threshold from a stored card rotation sequence corresponding to the identification information, the operations may comprise authenticating the user for at least one payment operation. The operations may further comprise: communicating the identification information to an authenticator, communicating the card rotation sequence to the authenticator, and receiving an authentication result from the authenticator. The authentication result may comprise a confirmation that the card rotation sequence is within the predetermined threshold from the stored card rotation sequence corresponding to the identification information. The operations may further comprise: encrypting the identification information prior to communicating to the authenticator, and encrypting the card rotation sequence prior to communicating to the authenticator.

Consistent with the present embodiments, a method for authenticating a user is disclosed. The method may comprise: receiving identification information from a user, receiving card rotation input from the user, and extracting a card rotation sequence from the card rotation input. When the card rotation sequence is within a predetermined threshold from a stored card rotation sequence corresponding to the identification information, the method may comprise authenticating the user for a secure operation. The method may further comprise communicating the identification information to an authenticator, communicating the card rotation sequence to the authenticator, and receiving an authentication result from the authenticator. The authentication result may comprise a confirmation that the card rotation sequence is within the predetermined threshold from the stored card rotation sequence corresponding to the identification information. The method may further comprise encrypting the identification information prior to communicating to the authenticator, and encrypting the card rotation sequence prior to communicating to the authenticator.

The disclosed systems and methods may be implemented using a combination of conventional hardware and software as well as specialized hardware and software, such as one or more machines constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
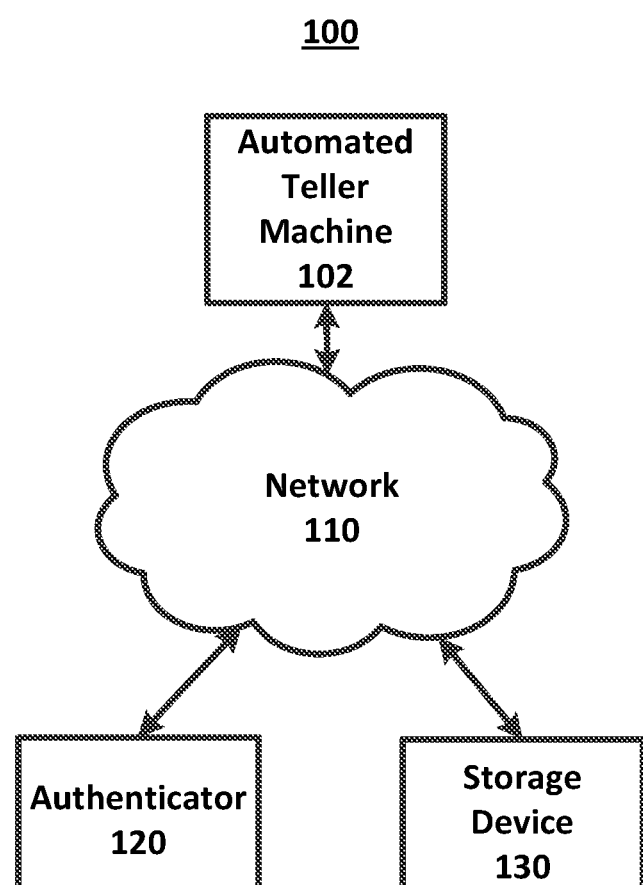
FIG. 1 is a block diagram of a first exemplary system for authenticating identification information of a user, consistent with disclosed embodiments.

Consistent with disclosed embodiments, systems and methods for authenticating identification information of a user are disclosed. As explained above, disclosed systems and methods provide efficiency and security over conventional approaches to authentication.

As used herein, an Automated Teller Machine (ATM) may refer to an electronic telecommunications device that enables customers of financial institutions to perform financial transactions, such as cash withdrawals, deposits, transfers of funds, or account information inquiries, at any time and without the need for direct interaction with bank staff. An ATM may be referred to as an automated banking machine (ABM), cash point, cash machine, or cash dispenser.

As used herein, a payment terminal may refer to an electronic telecommunications device that enables customers of a merchant to perform financial transactions, such as transferring funds to the merchant. Many payment terminals enable customers to receive cash back as part of their transaction. A payment terminal may be referred to as a Point of Sale (POS) terminal, credit card terminal, or Process Data Quickly (PDQ) terminal.

Embodiments consistent with the present disclosure may include identification information, which may comprise banking information. The banking information may comprise, for example, part or all of an account number, a financial institution, and/or bank routing information. Identification information may associate a user (i.e., customer) to banking information. Identification information may comprise user identification information. For example, user identification information may comprise a federal identification number (e.g., a social security number), a state identification number (e.g., a driver license number), and/or local identification information (e.g., a mailing address, a phone number).

Embodiments consistent with the present disclosure may include a card reader which may be configured for card rotation about: a primary axis of a bank card, a secondary axis of the bank card, and/or an axis perpendicular to the primary axis and the secondary axis of the bank card. A card reader may comprise: a gimbal, which comprises a support that can pivot about an axis, or a gimbal system of two or three gimbals, which may resemble two or three concentric rings. A card reader may be configured to accept passive and/or proactive card rotation input from a user. In passive card rotation input, a user may insert and/or remove a bank card from a card reader that is free to rotate about at least one axis. Natural hand movements by the user may move the card reader as a bank card is inserted and/or removed. The card rotation input(s) of the card reader before, during, and/or after the insertion and/or removal of a bank card may be recorded as a card rotation sequence for a user. In proactive card rotation input, a user may insert a bank card into a card reader and intentionally move the bank card and card reader through one or more card rotation inputs. A card reader may comprise a plurality of indents configured to provide tactile feedback to a user as the card reader is rotated about an axis. For example, indents may occur at every 30 degrees to resemble the hours of a clock face. In another example, indents may occur at every 6 degrees to resemble the minutes of a clock face.

Embodiments consistent with the present disclosure may include a card rotation sequence. A card rotation sequence may comprise at least one card rotation input, which may be entered by a user through use of a card reader, and may comprise at least one of a clockwise rotation, a counter-clockwise rotation, an upward rotation, a downward rotation, a left rotation, a right rotation, or any other card rotation input. A card rotation input may comprise a center input which may comprise a neutral position of a card reader at rest and/or a return to center after a previous card rotation input. A rolled input may comprise two inputs without a center input in between the two inputs. For example, a left rotation followed by a downward rotation may be considered as a rolled left-down input. In contrast, a left rotation followed by a center input followed by a downward rotation may be considered a left input followed by a downward input. A pause duration may comprise a length of time an input is held in position and/or a length of time between inputs. The length of time may require a minimum amount, such as, for example, 1 second. For example, a first card rotation sequence comprising a left input, hold for 2 seconds, and a right input may be distinct from a second card rotation sequence comprising a left input, hold for 4 seconds, and a right input.

Embodiments consistent with the present disclosure may include a stored card rotation sequence. A stored card rotation sequence may correspond to identification information of a user, and may comprise: a card rotation sequence chosen by a user, or a card rotation sequence entered by a user in response to a request for storing a card rotation sequence. A request for storing a card rotation sequence may require a login and password to an account associated with identification information of a user. A request for storing a card rotation sequence may require a PIN which may be required at a user interface, for example, of an ATM or POS payment terminal. A request for storing a card rotation sequence may comprise presentation of instructions for creating a card rotation sequence. In some embodiments, a stored card rotation sequence may be a sequence of inputs and pause durations selected via a user interface other than a card reader. For example, a list of possible inputs and pause durations may be presented to a user on a touchscreen display. A user may select a sequence of inputs, and optionally, pause durations, to be stored. In this example, future card rotation input from a user interface comprising a card reader may be compared to a stored card rotation sequence created via the touchscreen display. One of ordinary skill in the art would understand that other types of user interfaces other than card readers and touchscreen displays may be used to request and/or record a card rotation sequence to be stored as a stored card rotation sequence.

Embodiments consistent with the present disclosure may include a predetermined threshold. A predetermined threshold may be based on a portion (e.g., a percentage) of a card rotation input and/or a fixed amount of rotation. For example, a right input may comprise an entire amount of rotation in a card reader between a center input and a right rotation. If a predetermined threshold is set to, for example, 80 percent, then any rotation to the right equal to or greater than 80 percent of the entire amount of rotation available in a card reader between a center input and a right rotation may be considered within a predetermined threshold. In another example, a right rotation may comprise a rotation of 15 millimeters. If a predetermined threshold is set to, for example, 10 millimeters, then any rotation to the right equal to or greater than 10 millimeters may be considered within a predetermined threshold.

In some embodiments, a predetermined threshold may be based on a percentage of a pause duration and/or a fixed duration. For example, a pause duration may comprise 2 seconds. If a predetermined threshold is set to, for example, 80 percent, then any pause duration between 1.6 seconds and 2.4 seconds may be considered within a predetermined threshold. In another example, a pause duration may comprise 1 second. If a predetermined threshold is set to, for example, 0.5 seconds, then any pause duration between 0.5 seconds and 1.5 seconds may be considered within a predetermined threshold.

In some embodiments, a predetermined threshold may be based on an average of multiple card rotation sequences. A predetermined threshold may be specific to an individual user. For example, a request for storing a card rotation sequence may comprise a request to enter the same card rotation sequence multiple times. An amount of rotation and/or a pause duration may be recorded for each card rotation input of each card rotation sequence. The amounts of rotation for a specific card rotation input may be averaged over the multiple card rotation sequences to determine an average amount of rotation for the specific card rotation input. Similarly, the pause durations for a specific card rotation input and/or in between two consecutive card rotation inputs may be averaged over the multiple card rotation sequences to determine an average pause duration for the specific card rotation input and/or in between two consecutive card rotation inputs.

In some embodiments, a predetermined threshold may be based on a maximum variability over multiple card rotation sequences. For example, a request for storing a card rotation sequence may comprise a request to enter the same card rotation sequence multiple times. An amount of rotation and/or a pause duration may be recorded for each card rotation input of each card rotation sequence. A maximum range of amounts of rotation for a specific card rotation input over the multiple card rotation sequences may be used to determine a maximum amount of rotation for the specific card rotation input. Similarly, a maximum range of pause durations for a specific card rotation input and/or in between two consecutive card rotation inputs over the multiple card rotation sequences may be used to determine a maximum pause duration for the specific card rotation input and/or in between two consecutive card rotation inputs.

Embodiments consistent with the present disclosure may include ATM operations which may include, for example, cash withdrawals, deposits, transfers of funds, or account information inquiries. ATM operations may also include accepting a new card rotation sequence for a user and storing the card rotation sequence as a stored card rotation sequence.

Embodiments consistent with the present disclosure may include at least one payment operation which may include, for example, transferring funds to a merchant. Funds may be transferred via a credit transaction or a debit transaction. According to some embodiments, a payment transaction may comprise transferring part of the transaction amount in cash back to a customer.

Reference will now be made in detail to exemplary embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 is a block diagram of a first exemplary system 100 for authenticating identification information of a user, consistent with disclosed embodiments. System 100 may comprise: an Automated Teller Machine (ATM) 102, an authenticator 120, and a storage device 130. Components of system 100 (e.g., ATM 102, authenticator 120, storage device 130) may be configured to communicate with network 110. In some embodiments, not depicted in FIG. 1, authenticator 120 and/or storage device 130 may be a part of ATM 102. In some embodiments, not depicted in FIG. 1, ATM 102 may be configured to communicate directly with authenticator 120 and/or storage device 130, and over a secured connection. Consistent with the present embodiments, components of system 100 may be included in a cloud computing system. For example, one or more components of system 100 may be hosted by separate virtual computing instances of a cloud computing system.

In some embodiments, ATM 102 may include at least one memory, input/output device, processor, and/or other component. Authenticator 120 may include at least one memory, input/output device, processor, and/or other component, consistent with disclosed embodiments. Authenticator 120 may be configured to authenticate a card rotation sequence. Authenticator 120 may be configured to compare a card rotation sequence to a stored card rotation sequence. Storage device 130 may include at least one memory, input/output device, processor, and/or other component, consistent with disclosed embodiments. Storage device 130 may be configured to store a card rotation sequence as a stored card rotation sequence. The stored card rotation sequence may be stored with and/or linked to identification information for a user. Further details of an ATM are provided below (FIG. 2).

Network 110 may be a public network or private network and may include, for example, a wired or wireless network, including, without limitation, a Local Area Network, a Wide Area Network, a Metropolitan Area Network, an IEEE standard compliant wireless network (e.g., "Wi Fi"), a network of networks (e.g., the Internet), a land line telephone network, or any other network. Network 110 may be connected to other networks (not depicted in FIG. 1) to connect various system components to each other and/or to external systems or devices. In some embodiments, network 110 may be a secure network and require a password to access the network.

Figure 2:
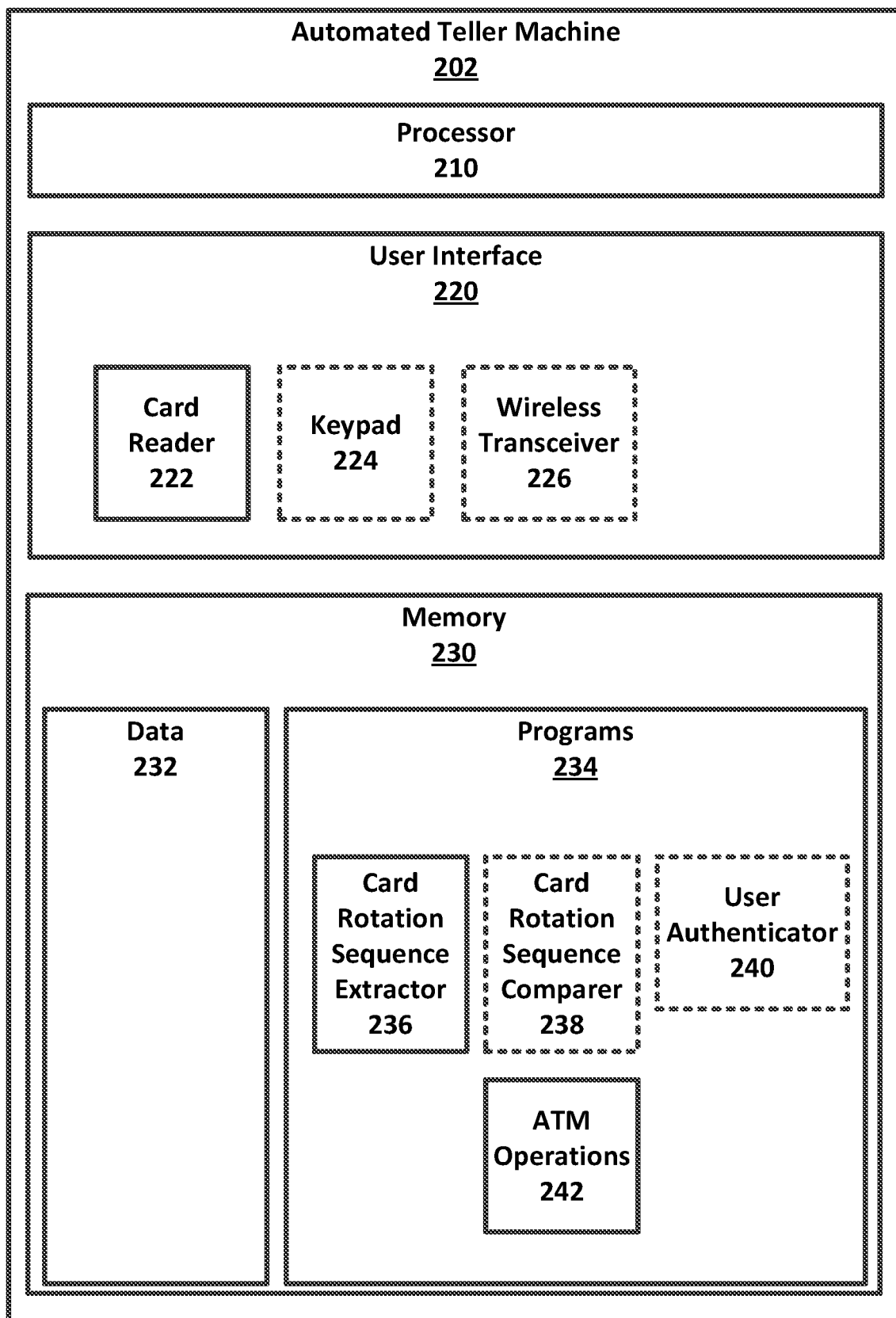
FIG. 2 is a block diagram of an exemplary Automated Teller Machine (ATM), consistent with disclosed embodiments.

FIG. 2 is a block diagram of an exemplary Automated Teller Machine (ATM) 202, consistent with disclosed embodiments. As shown, ATM 202 may comprise at least one processor 210, user interface 220, and/or memory 230. As will be appreciated by one skilled in the art, the components and arrangement of components included in ATM 202 may vary. For example, as compared to the depiction in FIG. 2, ATM 202 may include a larger or smaller number of processors, user interfaces, or memories. In addition, ATM 202 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may comprise known computing processors. In some embodiments, processor 210 may include a microprocessor, a single core, or multiple core processor that executes parallel processes simultaneously. For example, processor 210 may be a single core processor configured with virtual processing technologies. In some embodiments, processor 210 may use logical processors to simultaneously execute and control multiple processes, and may implement virtual machine technologies, or other known technologies to provide the ability to execute, control, run, manipulate, store, etc., multiple software processes, applications, programs, etc. In another embodiment, processor 210 may include a multiple core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 210 may execute various instructions stored in memory 230 to perform various functions of the disclosed embodiments described in greater detail below. Processor 210 may be configured to execute functions written in one or more known programming languages.

User interface 220 may include at least one card reader 222 and may be configured to receive card rotation input from a user via card reader 222. User interface 220 may include at least one keypad 224 and/or wireless transceiver 226. Wireless transceiver 226 may be configured to communicate with a wireless device, such as a smartphone, smartwatch, and/or electronic wallet. Card reader 222 may be configured to communicate with or read a bank card magnetically and/or wirelessly using, for example, RFID, NFC, Bluetooth, Bluetooth Low Energy (BLE), Wi-Fi, cellular, or any other wireless connection. In some embodiments not depicted in FIG. 2, user interface 220 may include at least one of a display, an LED, a router, a touchscreen, a keyboard, a microphone, a speaker, a haptic device, a camera, a button, a dial, a switch, a knob, an additional input device, an output device, or any other input/output device to perform methods of the disclosed embodiments. User interface 220 may be configured to receive identification information from a user.

Memory 230 may include a volatile or nonvolatile, magnetic, semiconductor, optical, removable, non-removable, or other type of storage device or tangible (i.e., non-transitory) computer readable medium, consistent with disclosed embodiments. Memory 230 may comprise data 232, programs 234, and/or other components.

Data 232 may comprise stored card rotation sequences. Data 232 may comprise stored identification information.

Programs 234 may comprise instructions configured to cause at least one processor 210 to perform operations. Programs 234 may include one or more programs (e.g., modules, code, scripts, or functions) used to perform methods consistent with disclosed embodiments, and operating systems (not shown) that perform known operating system functions when executed by one or more processors. Disclosed embodiments may operate and function with computer systems running any type of operating system. Programs 234 may be written in one or more programming or scripting languages. One or more of such software sections or modules of memory 230 may be integrated into a computer system, non-transitory computer readable media, or existing communications software. In some embodiments, programs 234 may be implemented or replicated as firmware or circuit logic.

One or more programs 234 may comprise at least one card rotation sequence extractor 236, which may be configured to extract a card rotation sequence from a card rotation input. One or more programs 234 may comprise at least one card rotation sequence comparer 238, which may be configured to compare a card rotation sequence to a stored card rotation sequence. In some embodiments, card rotation sequence comparer 238 may be configured to determine when a card rotation sequence is within a predetermined threshold from a stored card rotation sequence corresponding to identification information for a user. One or more programs 234 may comprise at least one user authenticator 240, which may be configured to authenticate a user. A user may be authenticated for at least one ATM operation 242, consistent with disclosed embodiments.

Figure 3:
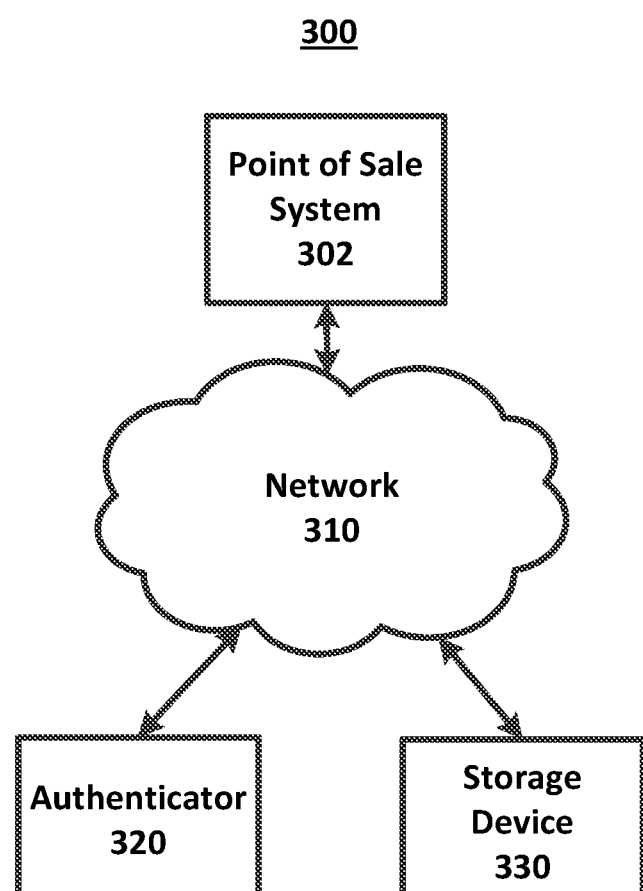
FIG. 3 is a block diagram of a second exemplary system for authenticating identification information of a user, consistent with disclosed embodiments.

FIG. 3 is a block diagram of a second exemplary system 300 for authenticating identification information of a user, consistent with disclosed embodiments. System 300 may comprise a Point of Sale (POS) system 302, an authenticator 320, and a storage device 330. Components of system 300 (e.g., POS System 302, authenticator 320, storage device 330) may be configured to communicate with network 310. In some embodiments, not depicted in FIG. 3, one or both of authenticator 320 and storage device 330 may be a part of POS System 302. In some embodiments, not depicted in FIG. 3, POS System 302 may be configured to communicate directly with authenticator 320 and/or storage device 330. POS System 302 may be configured to communicate with authenticator 320 and/or storage device 330 over a secured connection. Consistent with the present embodiments, components of system 300 may be included in a cloud computing system. For example, one or more components of system 300 may be hosted by separate virtual computing instances of a cloud computing system.

In some embodiments, POS System 302 may include at least one memory, input/output device, processor, and/or other component. Authenticator 320 may include at least one memory, input/output device, processor, and/or other component, consistent with disclosed embodiments. Authenticator 320 may be configured to authenticate a card rotation sequence and/or compare a card rotation sequence to a stored card rotation sequence. Storage device 330 may include at least one memory, input/output device, processor, and/or other component, consistent with disclosed embodiments, and may be configured to store a card rotation sequence as a stored card rotation sequence. The stored card rotation sequence may be stored with identification information for a user or may be linked to identification information for a user. Further details of a POS System are provided below (FIG. 4).

Network 310 may be a public network or private network and may include, for example, a wired or wireless network, including, without limitation, a Local Area Network, a Wide Area Network, a Metropolitan Area Network, an IEEE standard compliant wireless network (e.g., "Wi Fi"), a network of networks (e.g., the Internet), a land line telephone network, or any other network. Network 310 may be connected to other networks (not depicted in FIG. 3) to connect various system components to each other and/or to external systems or devices. In some embodiments, network 310 may be a secure network and require a password to access the network.

Figure 4:
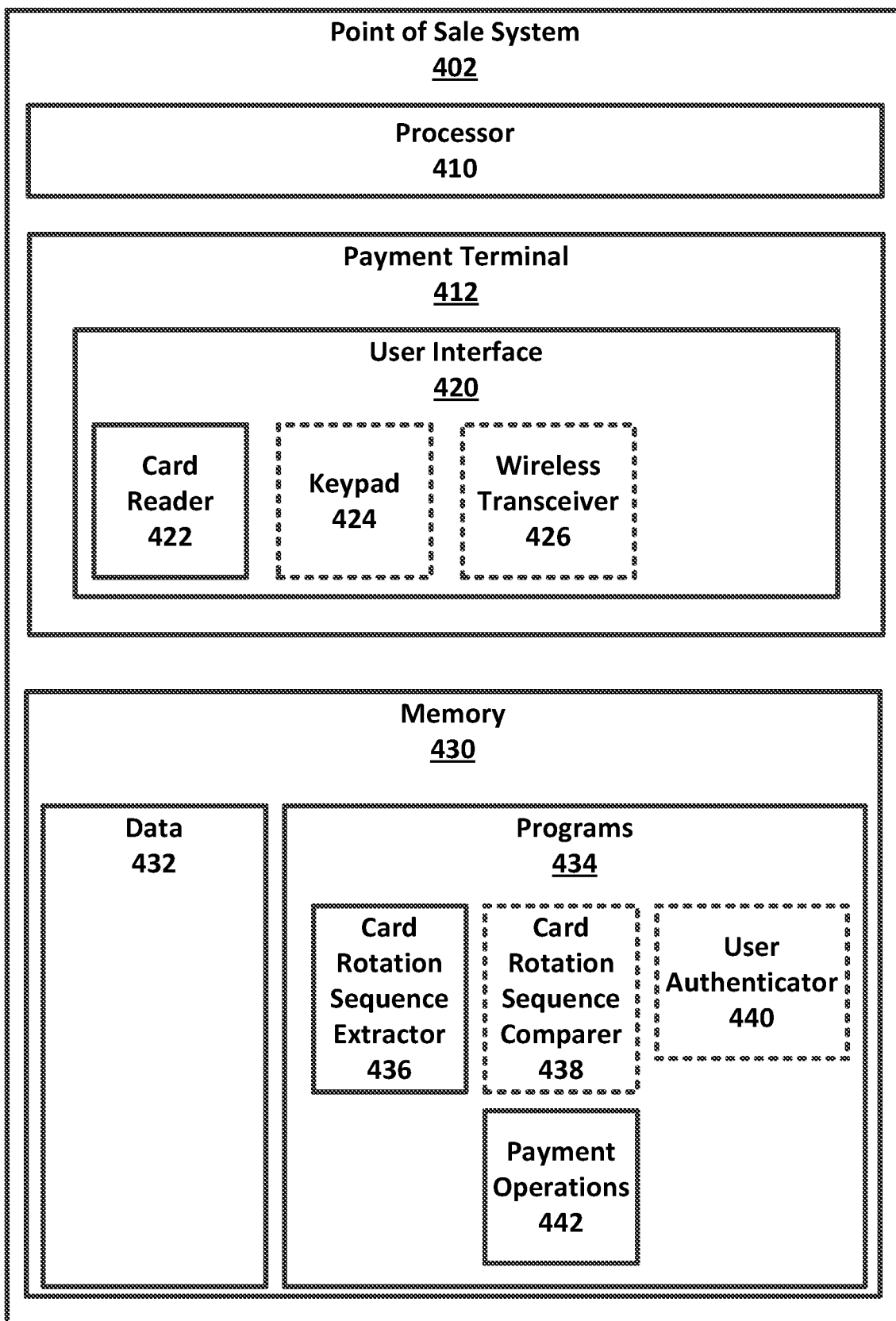
FIG. 4 is a block diagram of an exemplary Point of Sale (POS) system, consistent with disclosed embodiments.

FIG. 4 is a block diagram of an exemplary Point of Sale (POS) system 402, consistent with disclosed embodiments. As shown, POS System 402 may comprise at least one processor 410, payment terminal 412, and/or memory 430. As will be appreciated by one skilled in the art, the components and arrangement of components included in POS System 402 may vary. For example, as compared to the depiction in FIG. 4, POS System 402 may include a larger or smaller number of processors, user interfaces, or memories. In addition, POS System 402 may further include other components or devices not depicted that perform or assist in the performance of one or more processes consistent with the disclosed embodiments. The components and arrangements shown in FIG. 4 are not intended to limit the disclosed embodiments, as the components used to implement the disclosed processes and features may vary.

Processor 410 may comprise known computing processors. In some embodiments, processor 410 may include a microprocessor. Processor 410 may comprise a single core or multiple core processor that executes parallel processes simultaneously. For example, processor 410 may be a single core processor configured with virtual processing technologies. In some embodiments, processor 410 may use logical processors to simultaneously execute and control multiple processes. Processor 410 may implement virtual machine technologies, or other known technologies to provide the ability to execute, control, run, manipulate, store, etc., multiple software processes, applications, programs, etc. In another embodiment, processor 410 may include a multiple core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 410 may execute various instructions stored in memory 430 to perform various functions of the disclosed embodiments described in greater detail below. Processor 410 may be configured to execute functions written in one or more known programming languages.

Payment terminal 412 may comprise user interface 420, which may include at least one card reader 422, and may be configured to receive card rotation input from a user via card reader 422. User interface 420 may include at least one keypad 424 and/or wireless transceiver 426. Wireless transceiver 426 may be configured to communicate with a wireless device, such as, a smartphone, smartwatch, and/or electronic wallet. Card reader 422 may be configured to communicate with or read a bank card magnetically and/or wirelessly using, for example, RFID, NFC, Bluetooth, Bluetooth Low Energy (BLE), Wi-Fi, cellular, or any other wireless connection. In some embodiments not depicted in FIG. 4, user interface 420 may include at least one of a display, an LED, a router, a touchscreen, a keyboard, a microphone, a speaker, a haptic device, a camera, a button, a dial, a switch, a knob, an additional input device, an output device, or any other input/output device to perform methods of the disclosed embodiments. User interface 420 may be configured to receive identification information from a user.

Memory 430 may include a volatile or nonvolatile, magnetic, semiconductor, optical, removable, non-removable, or other type of storage device or tangible (i.e., non-transitory) computer readable medium, consistent with disclosed embodiments. Memory 430 may comprise data 432, programs 434, and/or other components. Data 432 may comprise stored card rotation sequences. Data 432 may comprise stored identification information.

Programs 434 may comprise instructions configured to cause at least one processor 410 to perform operations. Programs 434 may include one or more programs (e.g., modules, code, scripts, or functions) used to perform methods consistent with disclosed embodiments, and operating systems (not shown) that perform known operating system functions when executed by one or more processors. Disclosed embodiments may operate and function with computer systems running any type of operating system. Programs 434 may be written in one or more programming or scripting languages. One or more of such software sections or modules of memory 430 may be integrated into a computer system, non-transitory computer readable media, or existing communications software. In some embodiments, programs 434 may be implemented or replicated as firmware or circuit logic.

One or more programs 434 may comprise at least one card rotation sequence extractor 436, which may be configured to extract a card rotation sequence from a card rotation input. One or more programs 434 may comprise at least one card rotation sequence comparer 438, which may be configured to compare a card rotation sequence to a stored card rotation sequence. In some embodiments, card rotation sequence comparer 438 may be configured to determine when a card rotation sequence is within a predetermined threshold from a stored card rotation sequence corresponding to identification information for a user. One or more programs 434 may comprise at least one user authenticator 440, which may be configured to authenticate a user. A user may be authenticated for at least one payment operation 442, consistent with disclosed embodiments.

Figure 5:
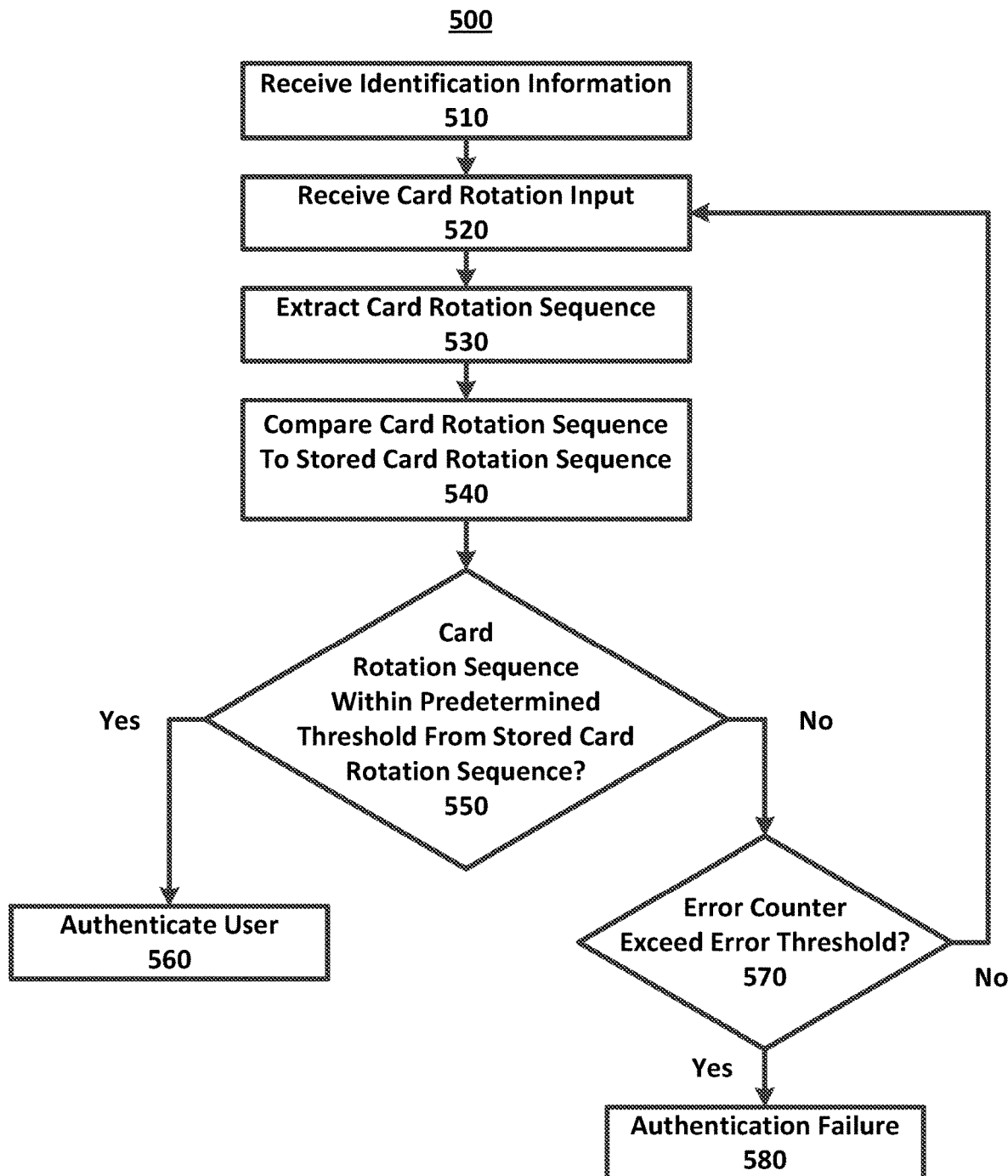
FIG. 5 depicts a first exemplary process for authenticating identification information of a user, consistent with disclosed embodiments.

FIG. 5 depicts a first exemplary process 500 for authenticating identification information of a user, consistent with disclosed embodiments. Process 500 may be implemented by using one or more aspects of systems 100 or 300, and/or one or more aspects of ATM 202 or POS system 402, to automatically perform one or more operations of the process. In some embodiments, ATM 202 or POS system 402 may perform process 500 using programs. One or more of authenticator (e.g., 120, 320), storage device (e.g., 130, 330), and/or other components of system 100 or 300 may perform operations of process 500, consistent with disclosed embodiments.

At step 510, ATM 202 or POS system 402 may receive identification information, consistent with disclosed embodiments. In some embodiments, identification information may be received from a bank card provided by the user of ATM 202 or POS system 402. In other embodiments, identification information may be received from a wireless device such as a smartphone, smartwatch, and/or electronic wallet provided by the user of ATM 202 or POS system 402.

At step 520, ATM 202 or POS system 402 may receive card rotation input, consistent with disclosed embodiments. In some embodiments, card rotation input may be received from a card reader (e.g., 222, 422). The card reader may be part of a user interface (e.g., 220, 420) which is part of ATM 202 or POS system 402.

At step 530, ATM 202 or POS system 402 may extract a card rotation sequence, consistent with disclosed embodiments. In some embodiments, a card rotation sequence may be extracted from a card rotation input.

At step 540, ATM 202 or POS system 402 may compare a card rotation sequence to a stored card rotation sequence, consistent with disclosed embodiments. A stored card rotation sequence may correspond to identification information for a user of ATM 202 or POS system 402. In some embodiments, a stored card rotation sequence may correspond to identification information when the stored card rotation sequence is stored with the identification information for a user. In other embodiments, a stored card rotation sequence may correspond to identification information when the stored card rotation sequence is linked to identification information for a user.

At step 550, ATM 202 or POS system 402 may determine if a card rotation sequence is within a predetermined threshold from a stored card rotation sequence corresponding to identification information for a user, consistent with disclosed embodiments. When it is determined that a card rotation sequence is within a predetermined threshold from a stored card rotation sequence, ATM 202 or POS system 402 may authenticate a user at step 560. A user may be authenticated for at least one ATM operation and/or at least one payment operation.

In some embodiments, when it is determined that a card rotation sequence is not within a predetermined threshold from a stored card rotation sequence corresponding to identification information for a user, ATM 202 or POS system 402 may increment an error counter and determine if the error counter exceeds an error threshold at step 570. For example, if an error threshold is set to two, the error threshold may be exceeded when a user fails three times to perform a card rotation sequence within a predetermined threshold from a stored card rotation sequence corresponding to identification information for the user. In some embodiments, when it is determined that an error counter exceeds an error threshold, ATM 202 or POS system 402 may perform an authentication failure at step 580. Authentication failure may comprise blocking a user from performing an ATM operation and/or a payment operation. Authentication failure may comprise returning a bank card to a user or retaining the bank card until the user passes a secondary authentication which may comprise: a biometric scan, entering a PIN, entering a code received via a wireless device, entering a login and/or password, and/or any other authentication operation. In some embodiments, when it is determined that an error counter does not exceed an error threshold, ATM 202 or POS system 402 may return to step 520 to receive another card rotation input. Steps 520, 530, 540, 550, and 570 may repeat until an error counter exceeds an error threshold.

In some embodiments, when authentication failures occur over a specific time period for a specific amount of users, ATM 202 or POS system 402 may communicate an error message to a system manager. For example, when authentication failures occur for five users within a four hour period, ATM 202 may communicate an error message to a system manager. In another example, when authentication failures occur for three users within a fifteen minute period, POS system 402 may communicate an error message to a system manager. The error message may be configured to alert a system manager to a potential malfunction in ATM 202 or POS system 402. As will be appreciated by one skilled in the art, the specific time periods and specific amounts of users mentioned above may vary. The specific time periods and specific amounts of users may be based on data including, but not limited to, a number of authentication attempts, unique users, transactions, ATM operations, payment operations, secure operations, and/or any other operation.

Figure 6:
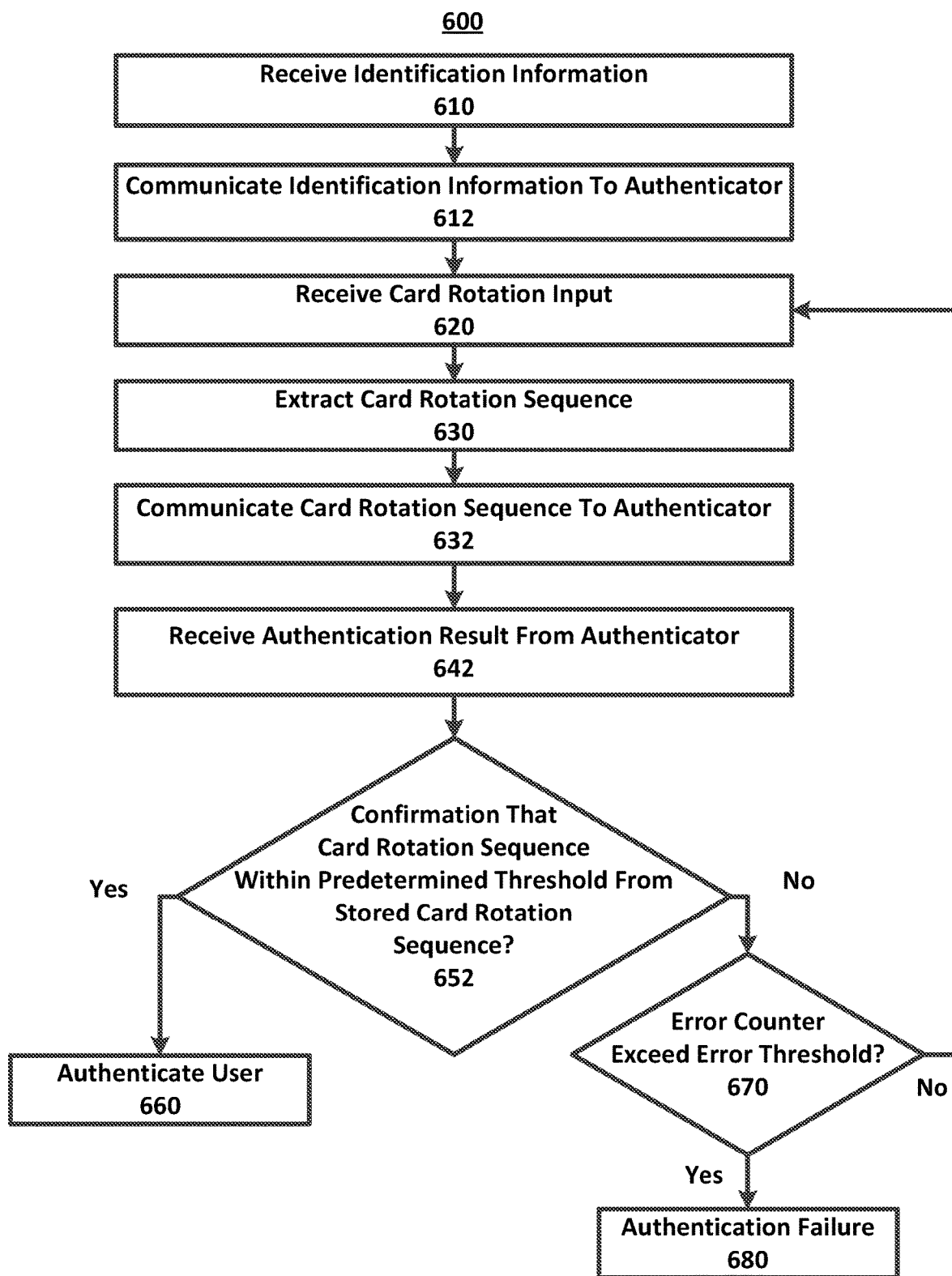
FIG. 6 depicts a second exemplary process for authenticating identification information of a user, consistent with disclosed embodiments.

FIG. 6 depicts a second exemplary process 600 for authenticating identification information of a user, consistent with disclosed embodiments. Process 600 may be implemented by using one or more aspects of systems 100 or 300, and/or one or more aspects of ATM 202 or POS system 402, to automatically perform one or more operations of the process. In some embodiments, ATM 202 or POS system 402 may perform process 600 using programs. One or more of authenticator (e.g., 120, 320), storage device (e.g., 130, 330), and/or other components of system 100 or 300 may perform operations of process 600, consistent with disclosed embodiments.

At step 610, ATM 202 or POS system 402 may receive identification information, consistent with disclosed embodiments. In some embodiments, identification information may be received from a bank card provided by the user of ATM 202 or POS system 402. In other embodiments, identification information may be received from a wireless device such as a smartphone, smartwatch, and/or electronic wallet provided by the user of ATM 202 or POS system 402.

At step 612, ATM 202 or POS system 402 may communicate identification information to an authenticator (e.g., 120, 320), consistent with disclosed embodiments. ATM 202 or POS system 402 may encrypt identification information before communicating the identification information to an authenticator.

At step 620, ATM 202 or POS system 402 may receive card rotation input, consistent with disclosed embodiments. In some embodiments, card rotation input may be received from a card reader (e.g., 222, 422). The card reader may be part of a user interface (e.g., 220, 420) which is part of ATM 202 or POS system 402.

At step 630, ATM 202 or POS system 402 may extract a card rotation sequence, consistent with disclosed embodiments. In some embodiments, a card rotation sequence may be extracted from a card rotation input.

At step 632, ATM 202 or POS system 402 may communicate a card rotation sequence to an authenticator (e.g., 120, 320), consistent with disclosed embodiments. ATM 202 or POS system 402 may encrypt a card rotation sequence before communicating the card rotation sequence to an authenticator.

At step 642, ATM 202 or POS system 402 may receive an authentication result from an authenticator (e.g., 120, 320), consistent with disclosed embodiments. An authenticator may be configured to compare a card rotation sequence to a stored card rotation sequence which may correspond to identification information for a user of ATM 202 or POS system 402. An authentication result may comprise a confirmation that a card rotation sequence is within a predetermined threshold from a stored card rotation sequence.

At step 652, ATM 202 or POS system 402 may determine if a confirmation has been received from an authenticator (e.g., 120, 320). The confirmation may confirm that a card rotation sequence is within a predetermined threshold from a stored card rotation sequence corresponding to identification information for a user. When it is determined that a confirmation has been received from an authenticator, ATM 202 or POS system 402 may authenticate a user at step 660. A user may be authenticated for at least one ATM operation and/or at least one payment operation.

In some embodiments, when it is determined that a confirmation has not been received from an authenticator (e.g., 120, 320), ATM 202 or POS system 402 may increment an error counter and determine if the error counter exceeds an error threshold at step 670. In some embodiments, when it is determined that an error counter exceeds an error threshold, ATM 202 or POS system 402 may perform an authentication failure at step 680. Authentication failure may comprise blocking a user from performing an ATM operation and/or a payment operation. Authentication failure may comprise returning a bank card to a user or retaining the bank card until the user passes a secondary authentication which may comprise: a biometric scan, entering a PIN, entering a code received via a wireless device, entering a login and/or password, and/or any other authentication operation. In some embodiments, when it is determined that an error counter does not exceed an error threshold, ATM 202 or POS system 402 may return to step 620 to receive another card rotation input. Steps 620, 630, 632, 642, 652, and 670 may repeat until an error counter exceeds an error threshold.

Figure 7:
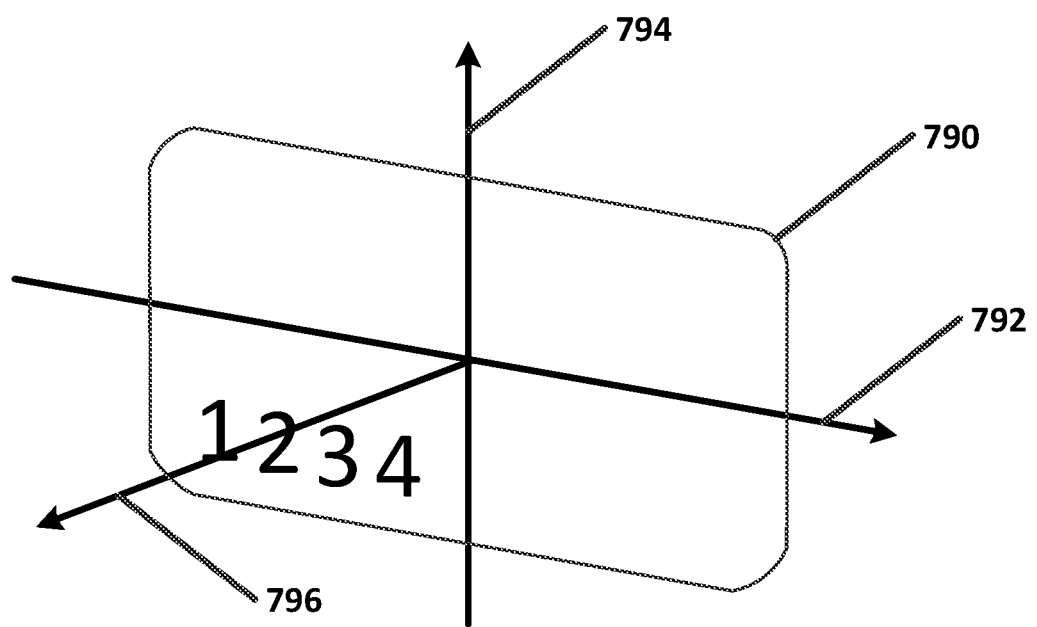
FIG. 7 depicts a primary axis and a secondary axis of a bank card, consistent with disclosed embodiments.

FIG. 7 depicts a primary axis 792 and a secondary axis 794 of a bank card 790, consistent with disclosed embodiments. Axis 796, as shown, is an example of an axis perpendicular to the primary axis 792 and perpendicular to the secondary axis 794 of the bank card 790.

Figure 8:
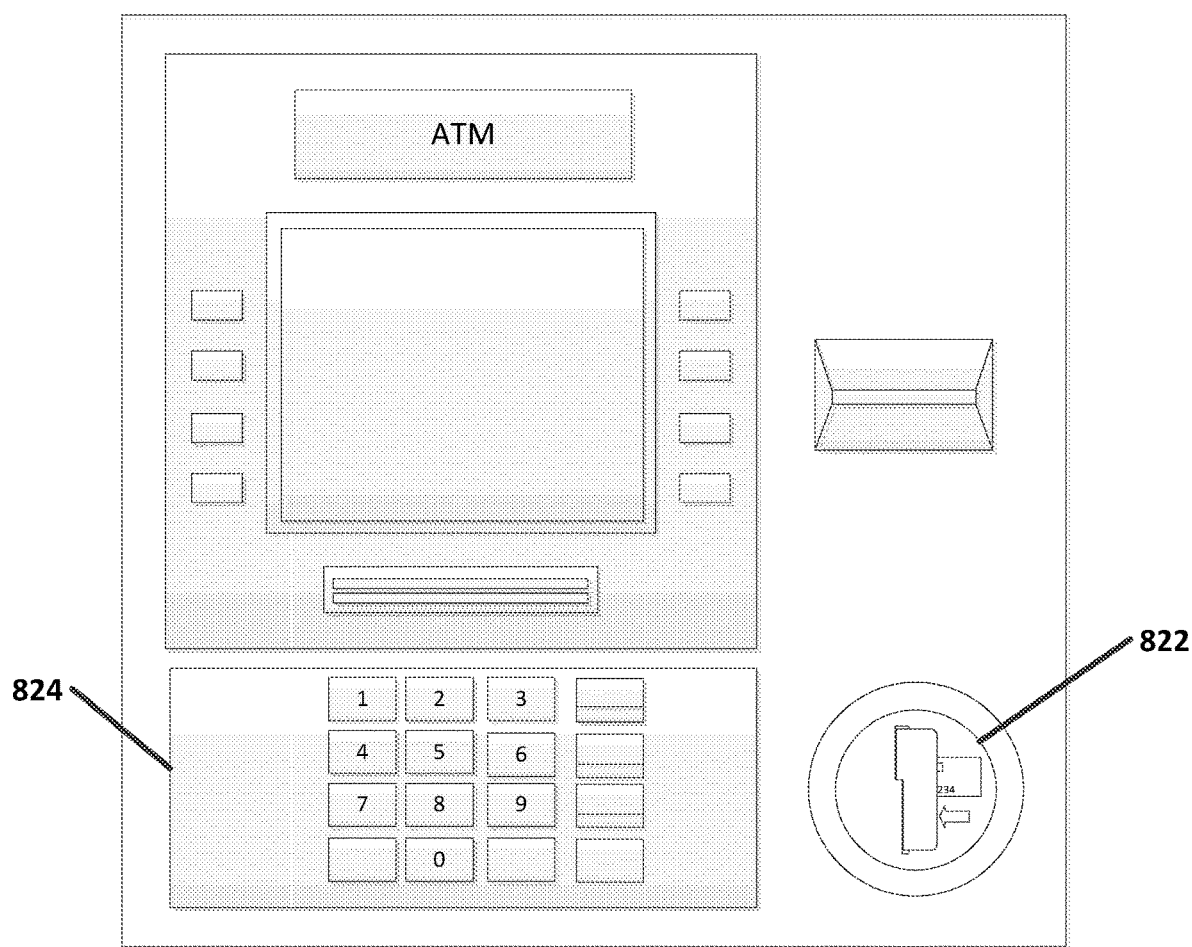
FIG. 8 depicts a first exemplary ATM, consistent with disclosed embodiments.

FIG. 8 depicts a first exemplary ATM 802, consistent with disclosed embodiments. In some embodiments, ATM 802 may implement components of system 100. ATM 802 may comprise at least some of the components of ATM 202. ATM 802 may be configured to perform operations of process 500 and/or process 600. ATM 802 may comprise a user interface which may comprise a card reader 822. Card reader 822 may be configured for card rotation about a primary axis of a bank card. A user interface may comprise a keypad 824, and may be configured to receive card rotation input from a user employing (i.e., using) card reader 822.

Figure 9:
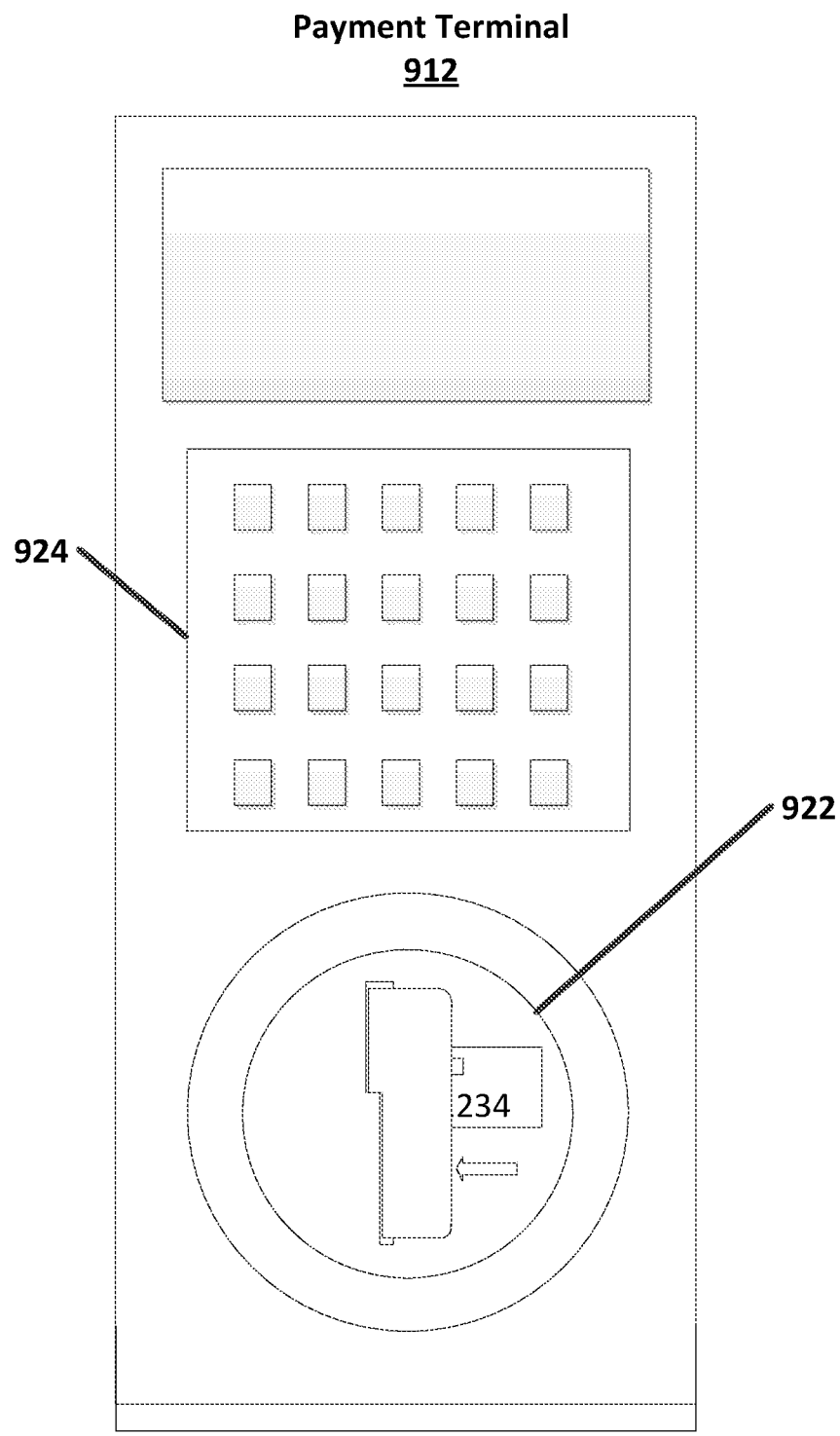
FIG. 9 depicts a first exemplary payment terminal, consistent with disclosed embodiments.

FIG. 9 depicts a first exemplary payment terminal 912, consistent with disclosed embodiments. In some embodiments, payment terminal 912 may comprise at least some of the components of payment terminal 412 and/or other components of POS system 402. In some embodiments, payment terminal 912 may include at least one memory, at least one processor, and/or at least one other component, and may be configured to perform operations of process 500 and/or process 600. Payment terminal 912 may comprise a user interface which may comprise a card reader 922. Card reader 922 may be configured for card rotation about a primary axis of a bank card. A user interface may comprise a keypad 924, and may be configured to receive card rotation input from a user employing (i.e., using) card reader 922.

Figure 10A:
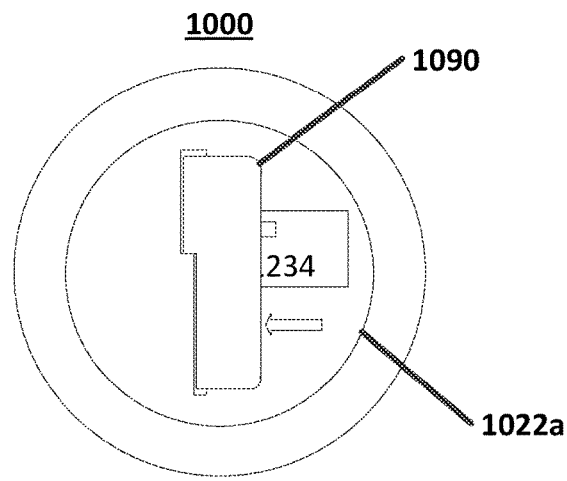
FIGS. 10a, 10b, and 10c depict a first exemplary card reader in various rotational positions, consistent with disclosed embodiments.
Figure 10B:
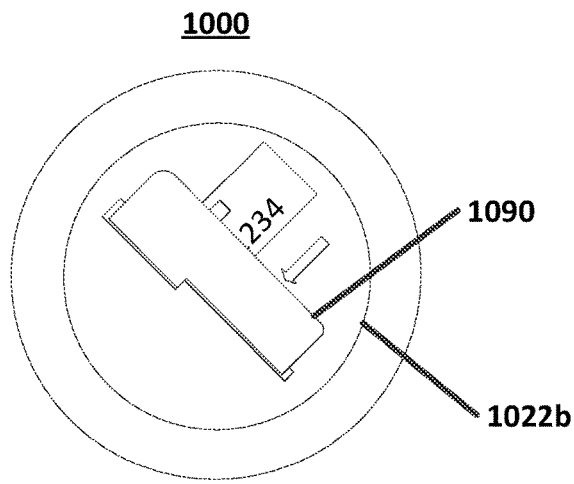
Figure 10C:
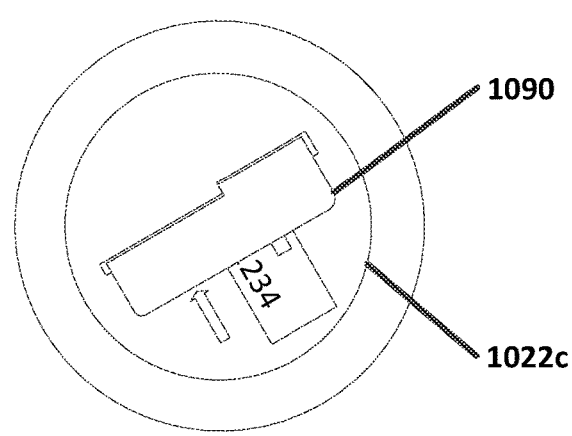

FIGS. 10a, 10b, and 10c depict a first exemplary card reader 1000 in various exemplary rotational positions, consistent with disclosed embodiments. Card reader 1000 may be configured for card rotation about a primary axis of a bank card 1090 as shown in rotational positions 1022a, 1022b, and 1022c. Rotational position 1022a illustrates an example of a vertical or neutral rotation. Rotational position 1022b illustrates an example of a counter-clockwise rotation. Rotational position 1022c illustrates an example of a clockwise rotation.

Figure 11:
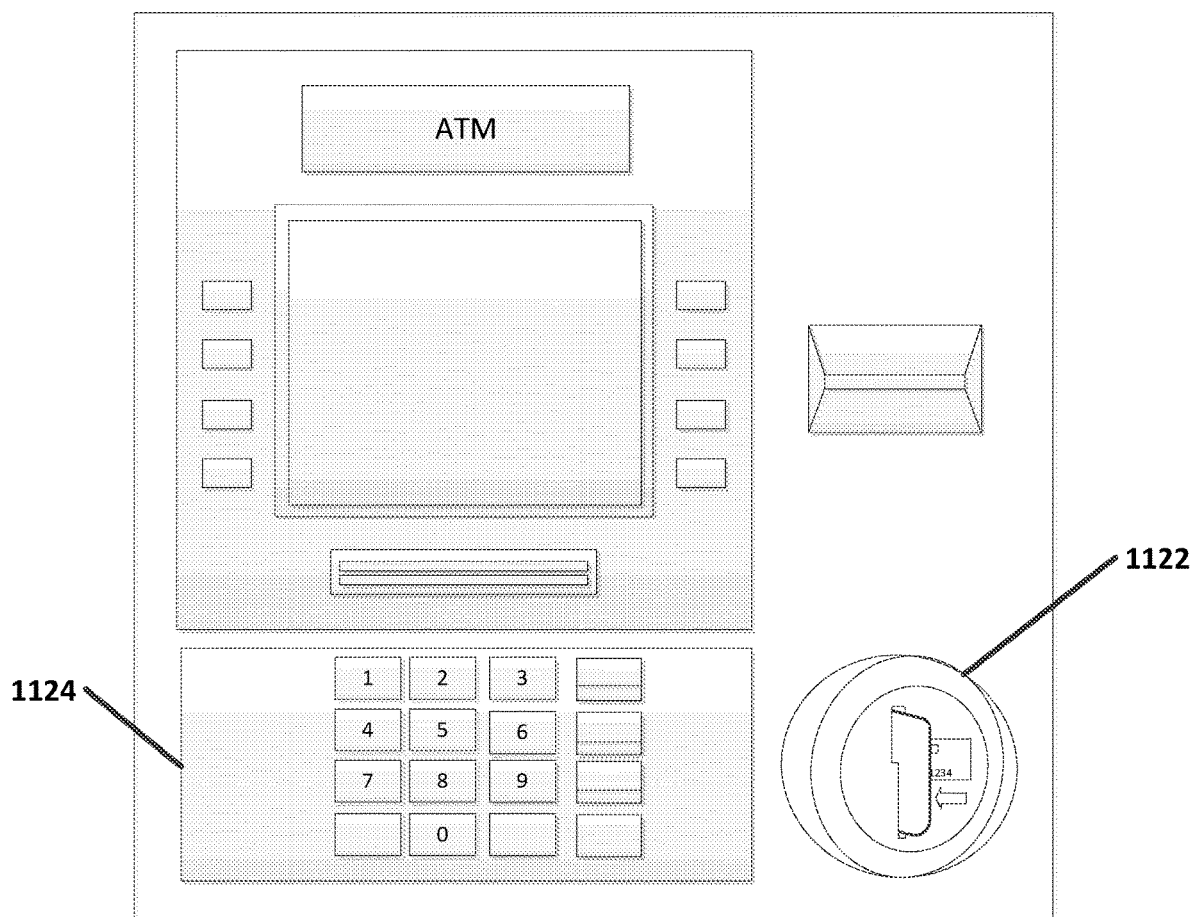
FIG. 11 depicts a second exemplary ATM, consistent with disclosed embodiments.

FIG. 11 depicts a second exemplary ATM 1102, consistent with disclosed embodiments. In some embodiments, ATM 1102 may implement components of system 100. ATM 1102 may comprise at least some of the components of ATM 202. ATM 1102 may be configured to perform operations of process 500 and/or process 600. ATM 1102 may comprise a user interface which may comprise a card reader 1122. Card reader 1122 may be configured for card rotation about a primary axis of a bank card, a secondary axis of the bank card, and/or an axis perpendicular to the primary axis and the secondary axis of the bank card. A user interface may comprise a keypad 1124, and may be configured to receive card rotation input from a user employing (i.e., using) card reader 1122.

Figure 12:
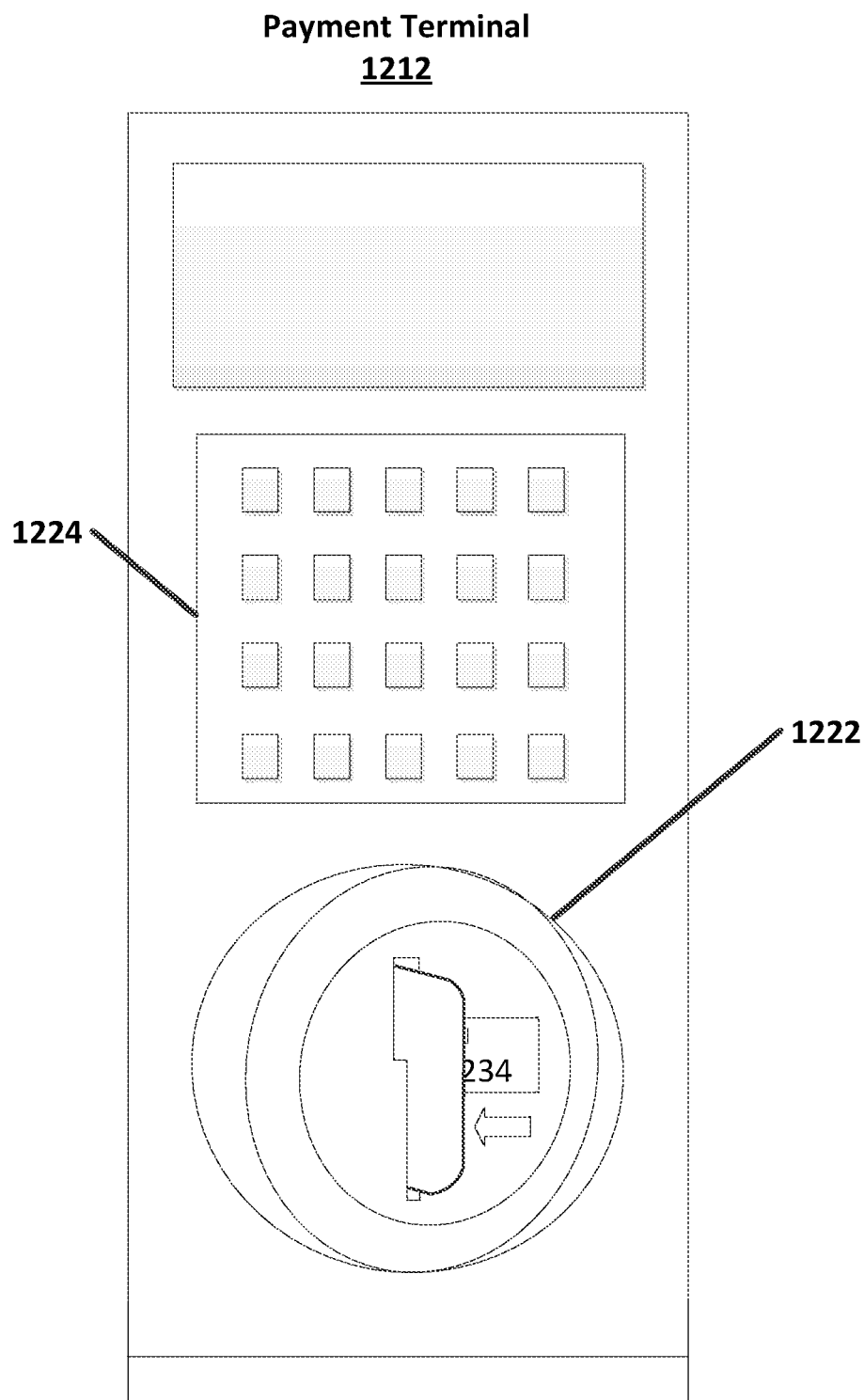
FIG. 12 depicts a second exemplary payment terminal, consistent with disclosed embodiments.
Figure 13A:
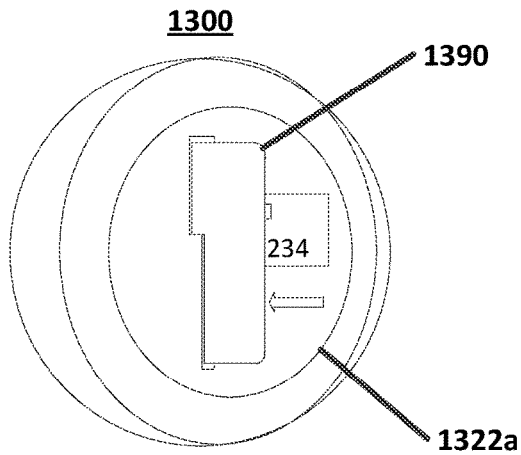
FIGS. 13a, 13b, 13c, 13d, 13e, and 13f depict a second exemplary card reader in various rotational positions, consistent with disclosed embodiments.
Figure 13B:
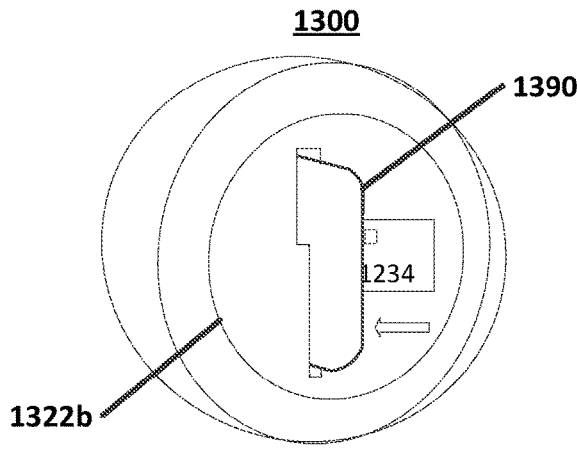
Figure 13C:
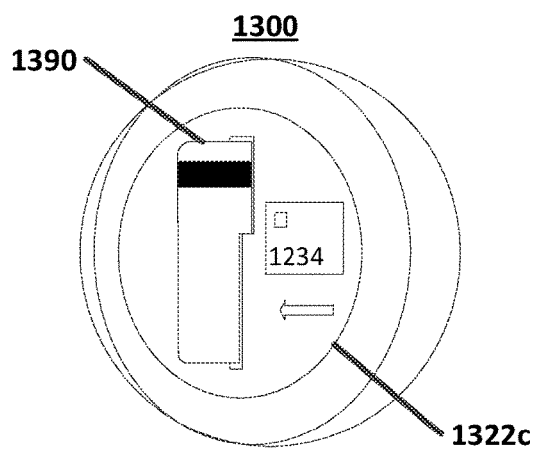
Figure 13D:
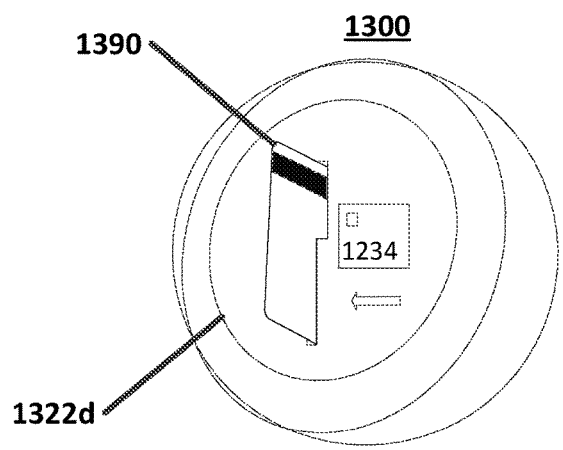
Figure 13E:
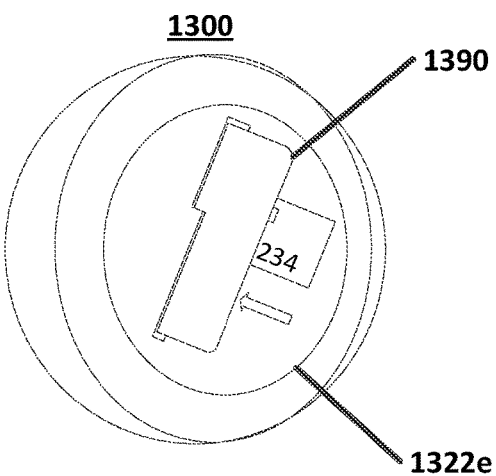
Figure 13F:
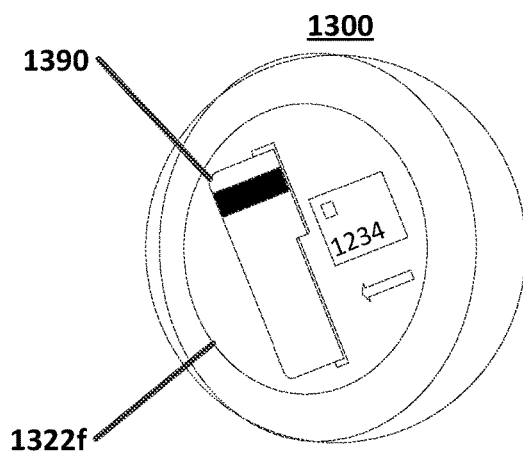

FIG. 12 depicts a second exemplary payment terminal 1212, consistent with disclosed embodiments. In some embodiments, payment terminal 1212 may comprise at least some of the components of payment terminal 412 and/or other components of POS system 402. In some embodiments, payment terminal 1212 may include at least one memory, at least one processor, and/or at least one other component, and may be configured to perform operations of process 500 and/or process 600. Payment terminal 1212 may comprise a user interface which may comprise a card reader 1222. Card reader 1222 may be configured for card rotation about a primary axis of a bank card, a secondary axis of the bank card, and/or an axis perpendicular to the primary axis and the secondary axis. A user interface may comprise a keypad 1224, and may be configured to receive card rotation input from a user employing (i.e., using) card reader 1222.

FIGS. 13a, 13b, 13c, 13d, 13e, and 13f depict a second exemplary card reader 1300 in various rotational positions, consistent with disclosed embodiments. Card reader 1300 may be configured for card rotation about a primary axis, a secondary axis, and an axis perpendicular to the primary axis and the secondary axis of bank card 1390 as shown in rotational positions 1322a, 1322b, 1322c, 1322d, 1322e, and 1322f. Rotational position 1322a illustrates an example of a vertical or neutral rotation about the primary axis, and a right rotation about the secondary axis. Rotational position 1322b illustrates an example of a vertical or neutral rotation about the primary axis, a right rotation about the secondary axis, and a downward rotation about the axis perpendicular to the primary axis and the secondary axis. Rotational position 1322c illustrates an example of a vertical or neutral rotation about the primary axis, and a left rotation about the secondary axis. Rotational position 1322d illustrates an example of a vertical or neutral rotation about the primary axis, a left rotation about the secondary axis, and an upward rotation about the axis perpendicular to the primary axis and the secondary axis. Rotational position 1322e illustrates an example of a clockwise rotation about the primary axis, a right rotation about the secondary axis, and a downward rotation about the axis perpendicular to the primary axis and the secondary axis. Rotational position 1322f illustrates an example of a counter-clockwise rotation about the primary axis, a left rotation about the secondary axis, and a downward rotation about the axis perpendicular to the primary axis and the secondary axis. One of ordinary skill in the art would understand that many additional rotational positions are possible though the employment (i.e., use) of card reader 1300.

In some embodiments, an ATM (e.g., 102, 202, 802, 1102) may request identification information from a user. After receiving identification information from a user, the ATM may request a card rotation sequence and/or a PIN. A request for a card rotation sequence, a PIN, or both may be based on a user preference. A user preference may be stored in an account corresponding to identification information of a user.

In some embodiments, a POS system (e.g., 302, 402) or a component of a POS system (e.g., payment terminal 412, payment terminal 912, payment terminal 1212) may request identification information from a user. After receiving identification information from a user, the POS system or the component of the POS system may request a card rotation sequence and/or a PIN. A request for a card rotation sequence, a PIN, or both may be based on a user preference. A user preference may be stored in an account corresponding to identification information of a user.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A method for authenticating a user, the method comprising:
receiving, from a card reader configured for rotation about an axis of a bank card, card rotation input obtained via rotating the card reader about the axis while the bank card is inserted in the card reader;
extracting a card rotation sequence from the card rotation input;
determining the card rotation sequence is within a predetermined threshold from a stored card rotation sequence; and
authenticating the user for a bank operation.

2. The method of claim 1, further comprising:
receiving identification information from at least one selected from the group of the bank card and a wireless device,
wherein the stored card rotation sequence corresponds to the identification information.

3. The method of claim 2, wherein the identification information comprises at least one selected from the group of an account number, financial institution information, and routing information.

4. The method of claim 2, wherein the identification information comprises at least one selected from the group of a federal identification number, a state identification number, and local identification information.

5. The method of claim 2, wherein the identification information comprises a card rotation sequence chosen by the user.

6. The method of claim 2, wherein the identification information comprises a card rotation sequence entered by the user in response to a request for storing a card rotation sequence.

7. The method of claim 1, wherein the stored card rotation sequence comprises a sequence of one or more inputs and one or more pause durations.

8. The method of claim 7, wherein the stored card rotation sequence is selected by the user via a user interface.

9. The method of claim 1, wherein the axis is a primary axis of the bank card.

10. The method of claim 1, wherein the axis is a secondary axis of the bank card.

11. An Automated Teller Machine (ATM), comprising:
at least one memory storing instructions; and at least one processor configured to execute the instructions to perform operations comprising:

receiving, from a card reader configured for rotation about an axis of a bank card, card rotation input obtained via rotating the card reader about the axis while the bank card is inserted in the card reader;

extracting a card rotation sequence from the card rotation input;

determining the card rotation sequence is within a predetermined threshold from a stored card rotation sequence; and authenticating a user for an ATM operation.

12. The ATM of claim 11, wherein the card rotation sequence comprises at least one selected from the group of a clockwise rotation, a counter-clockwise rotation, an upward rotation, a downward rotation, a left rotation, a right rotation, and a pause duration.

13. The ATM of claim 11, wherein authenticating the user comprises:

receiving identification information from at least one selected from the group of the bank card and a wireless device;

communicating the identification information to an authenticator;

communicating the card rotation sequence to the authenticator; and receiving an authentication result from the authenticator, the authentication result comprising a confirmation that the card rotation sequence is within a predetermined threshold from the stored card rotation sequence corresponding to the identification information.

14. The ATM of claim 13, wherein the predetermined threshold is based on a portion of a card rotation input.

15. The ATM of claim 13, wherein the predetermined threshold is based on a fixed amount of rotation.

16. The ATM of claim 13, wherein the predetermined threshold is based on an average of multiple card rotation sequences.

17. The ATM of claim 13, wherein the predetermined threshold is specific to the user.

18. A non-transitory computer-readable medium storing instructions that, when executed by a processor, cause the processor to perform a method comprising:

receiving, from a card reader configured for rotation about an axis of a bank card, card rotation input obtained via rotating the card reader about the axis while the bank card is inserted in the card reader;

extracting a card rotation sequence from the card rotation input;

determining the card rotation sequence is within a predetermined threshold from a stored card rotation sequence; and authenticating a user for an Automated Teller Machine (ATM) operation.

19. The non-transitory computer-readable medium of claim 18, wherein the ATM operation comprises at least one selected from the group of a cash withdrawal, a deposit, a transfer of funds, and an account information inquiry.

20. The non-transitory computer-readable medium of claim 18, wherein the ATM operation comprises accepting a new card rotation sequence for the user and storing the new card rotation sequence as a stored card rotation sequence.

* * * * *